United States Patent
Mao et al.

(10) Patent No.: US 9,690,399 B2
(45) Date of Patent: Jun. 27, 2017

(54) SIGNAL DECODING AND MODULATION PROCESSING SYSTEM FOR CAPACITIVE STYLUS

(71) Applicant: WALTOP INTERNATIONAL CORPORATION, Hsinchu (TW)

(72) Inventors: Chung-Fuu Mao, Hsinchu (TW); Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 4 days.

(21) Appl. No.: 14/959,959

(22) Filed: Dec. 4, 2015

(65) Prior Publication Data

US 2017/0108963 A1 Apr. 20, 2017

(30) Foreign Application Priority Data

Oct. 16, 2015 (TW) .............................. 104134130 A

(51) Int. Cl.
*G06F 3/044* (2006.01)
*G06F 3/0354* (2013.01)

(52) U.S. Cl.
CPC .......... *G06F 3/03545* (2013.01); *G06F 3/044* (2013.01)

(58) Field of Classification Search
CPC ...... G06F 3/0317; G06F 3/0321; G06F 3/033; G06F 3/03542; G06F 3/03545–3/03546; G06F 3/037; G06F 3/0386
See application file for complete search history.

(56) References Cited

U.S. PATENT DOCUMENTS

| | | | | |
|---|---|---|---|---|
| 4,486,853 A * | 12/1984 | Parsons | ............... | H04L 12/1804 345/418 |
| 8,773,405 B1 * | 7/2014 | Ryshtun | ............... | G06F 3/03545 178/19.03 |
| 8,797,301 B2 * | 8/2014 | Ryshtun | ............... | G06F 3/0416 178/19.03 |
| 8,922,527 B2 * | 12/2014 | Ryshtun | ............... | G06F 3/0416 345/174 |
| 9,310,923 B2 * | 4/2016 | Krah | ............... | G06F 3/0416 |
| 2005/0245298 A1 * | 11/2005 | Mori | ............... | H04B 7/0814 455/575.7 |
| 2010/0085325 A1 * | 4/2010 | King-Smith | ............... | G06F 3/03545 345/174 |
| 2012/0105361 A1 * | 5/2012 | Kremin | ............... | G06F 3/03545 345/174 |
| 2012/0105362 A1 * | 5/2012 | Kremin | ............... | G06F 3/03545 345/174 |

(Continued)

*Primary Examiner* — Gene W Lee
(74) *Attorney, Agent, or Firm* — Donald E. Stout; Stout, Uxa & Buyan, LLP

(57) ABSTRACT

A signal decoding and modulation processing system for capacitive stylus is disclosed. The system includes a micro controller unit (MCU) and a digital processing unit. The digital processing unit is electrically connected to the MCU. The digital processing unit includes a decoding module and a modulating module. The decoding module is configured to decode an input signal from a touch panel, so as to generate a decoded input content. Then, the MCU generates a feedback data according to the decoded input content. The modulating module receives the feedback data from the MCU and performs a modulation process accordingly for generating a differential binary phase shift keying (DBPSK) output signal, which is sent back to the touch panel.

11 Claims, 2 Drawing Sheets

(56) References Cited

U.S. PATENT DOCUMENTS

| | | | |
|---|---|---|---|
| 2013/0207925 A1* | 8/2013 | Ryshtun | G06F 3/0416 345/174 |
| 2013/0207926 A1* | 8/2013 | Kremin | G06F 3/0383 345/174 |
| 2013/0207938 A1* | 8/2013 | Ryshtun | G06F 3/0416 345/179 |
| 2014/0028577 A1* | 1/2014 | Krah | G06F 3/0416 345/173 |
| 2015/0054783 A1* | 2/2015 | Curtis | G06F 3/03545 345/174 |
| 2015/0062094 A1* | 3/2015 | Ryshtun | G06F 3/0416 345/179 |
| 2015/0338950 A1* | 11/2015 | Ningrat | G06F 3/03545 345/174 |
| 2016/0116997 A1* | 4/2016 | Kim | G06F 3/03545 345/174 |
| 2016/0179249 A1* | 6/2016 | Ballan | G06F 3/0416 345/174 |

\* cited by examiner

SIGNAL DECODING AND MODULATION PROCESSING SYSTEM FOR CAPACITIVE STYLUS

CLAIM OF PRIORITY

The present application claims priority from Taiwan Application No. 10413410, filed on Oct. 16, 2015 and entitled "SIGNAL DECODING AND MODULATION PROCESSING SYSTEM FOR CAPACITIVE STYLUS", the contents of which are expressly incorporated herein by reference in their entirety.

BACKGROUND OF THE INVENTION

1. Field of the Invention

The present invention generally relates to a signal decoding and modulation processing system, and particularly relates to a signal decoding and modulation processing system for a capacitive stylus.

2. Description of Related Art

Capacitive touch input technology has been widely applied in touch panel, especially in the capacitive stylus and application thereof. However, One-way signal transmission is most adapted between the conventional capacitive stylus and the touch panel, thus the user can only unilaterally provide control signals from the capacitive stylus to the touch panel. On the other hand, the touch panel display also cannot transmit the control signal to exchange the background information and the setting parameters with the capacitive stylus. Thus, it is hard to improve the functionality and application between the capacitive stylus and the touch panel.

Therefore, there is a need to provide a signal decoding and modulation processing system for a capacitive stylus, so that the bi-directional signal transmission and the feedback effect between the capacitive touch panel and the capacitive stylus may be well realized to improve the precision, fluency and display effect of the capacitive stylus.

SUMMARY OF THE INVENTION

In view of the foregoing, it is an object of embodiments of the present invention to provide a signal decoding and modulation processing system for a capacitive stylus, so that the bi-directional signal transmission and the feedback effect between the capacitive touch panel and the capacitive stylus can be well realized, in order to improve the precision, fluency and display effect of the capacitive stylus using on the touch panel.

According to the object, one embodiment of the present invention provides a signal decoding and modulation processing system for a capacitive stylus. The signal decoding and modulation processing system includes a micro controller unit and a digital processing unit. The digital processing unit is electrically connected with the micro controller unit. The digital processing unit includes a decoding module and a modulating module. The decoding module is configured to decode an input signal from a touch panel so as to correspondingly generate a decoded input content, and the decoded input content is transmitted to the micro controller unit. Then, the micro controller unit generates a feedback data according to the decoded input content. The modulating module is configured to receive the feedback data from the micro controller unit and perform a modulation process accordingly, so as to generate a differential binary phase shift keying (DBPSK) output signal, which is sent back to the touch panel.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1:
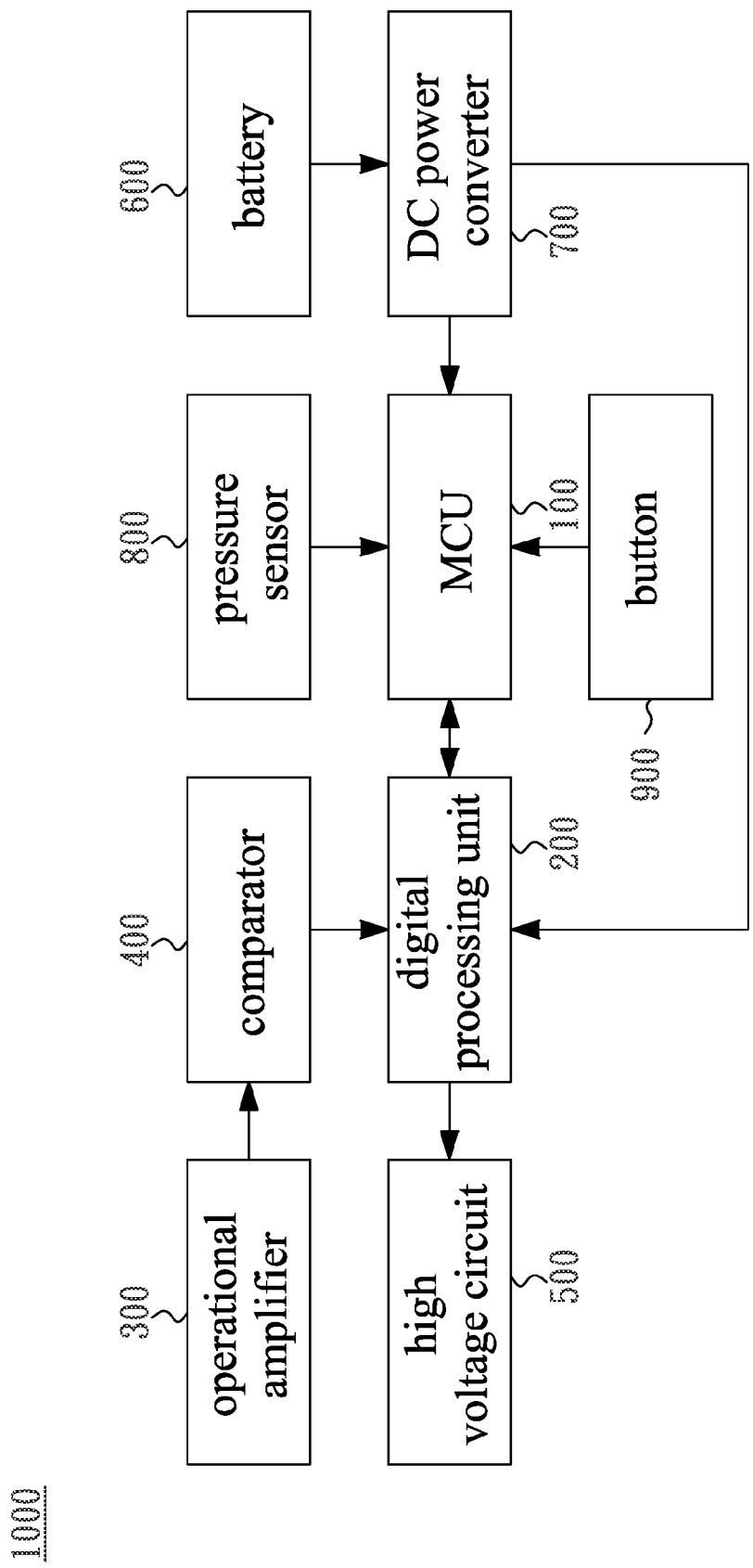
FIG. 1 illustrates a function block diagram of the signal decoding and modulation processing system for a capacitive stylus according to one embodiment of the invention.
Figure 2:
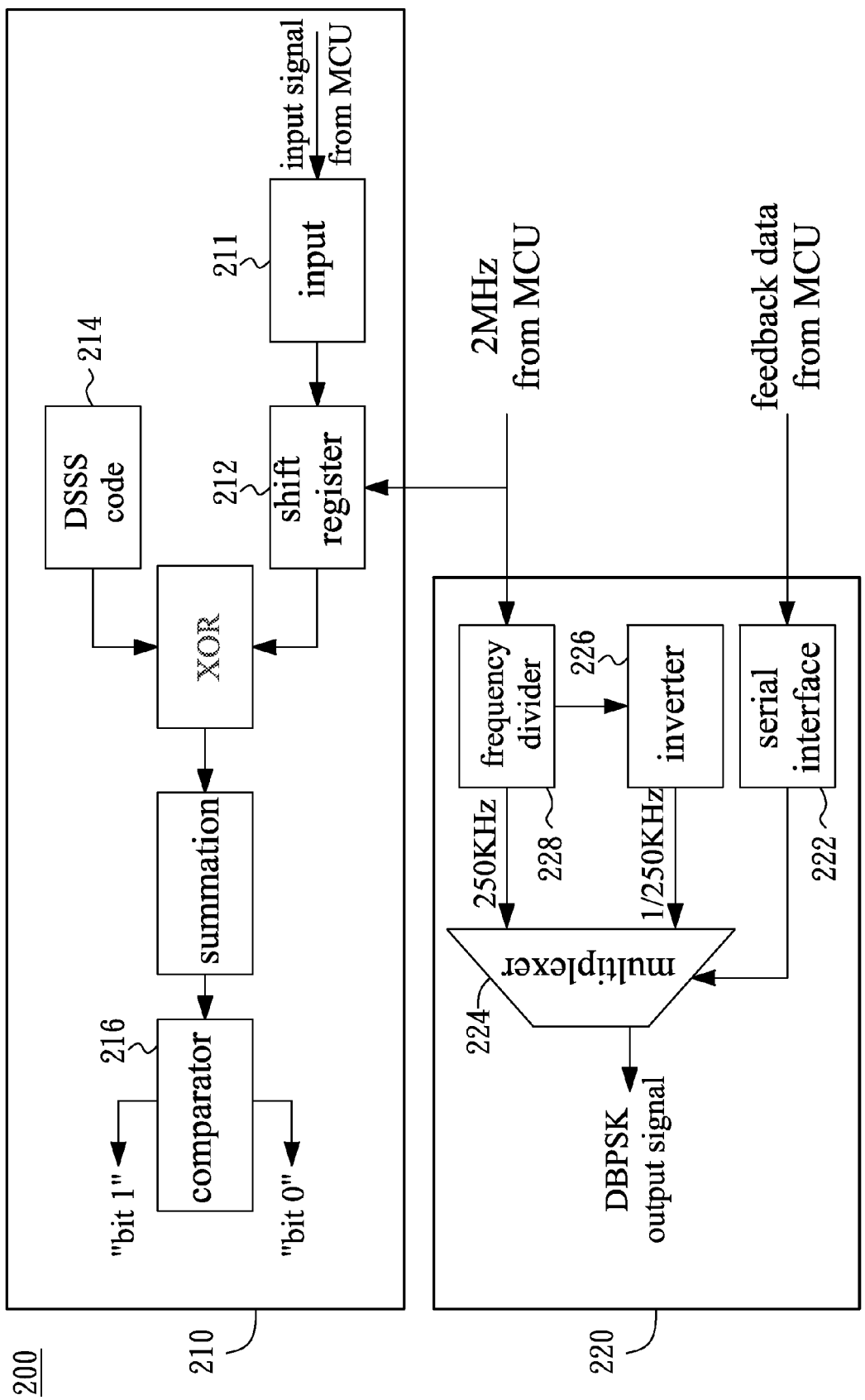
FIG. 2 illustrates a function block diagram of the digital processing unit of the signal decoding and modulation processing system according to one embodiment of the invention.

Referring to FIG. 1 and FIG. 2, FIG. 1 illustrates a function block diagram of the signal decoding and modulation processing system for a capacitive stylus according to one embodiment of the invention, and FIG. 2 illustrates a function block diagram of the digital processing unit of the signal decoding and modulation processing system in FIG. 1, according to one embodiment of the invention. As shown in figures, the signal decoding and modulation processing system 1000 for a capacitive stylus includes a micro controller unit (MCU) 100 and a digital processing unit 200. The digital processing unit 200 is electrically connected with the micro controller unit 100. The digital processing unit 200 includes a decoding module 210 and a modulating module 220. The decoding module 210 is configured to decode an input signal from touch panel so as to correspondingly generate a decoded input content, and the decoded input content is transmitted to the micro controller unit 100. Then, the micro controller unit 100 generates a feedback data according to the decoded input content. The modulating module 210 is configured to receive the feedback data from the micro controller unit 100 and perform a modulation process accordingly, so as to generate a DBPSK output signal. The DBPSK output signal is sent to the touch panel.

Furthermore, in one embodiment, the capacitive stylus can include a receiving ring. The input signal is generated from the touch panel, and when the capacitive stylus is connected with the touch panel, the input signal is then transmitted from the receiving ring to the capacitive stylus. The input signal may include the background information or control commands of the touch panel.

Referring to FIG. 1 and FIG. 2, the signal decoding and modulation processing system 1000 may further includes an operational amplifier 300 and a comparator 400. The comparator 400 is electrically connected with the operational amplifier 300 and the digital processing unit 200. After the input signal is transmitted into the capacitive stylus from the receiving ring, the input signal will be processed by the operational amplifier 300 and the comparator 400 in sequential order. Then, the processed input signal is transmitted to an input 211 of the decoding module 210 of the digital processing unit 200.

Moreover, the decoding module 210 can include a shift register 212 and a direct sequence spread spectrum (DSSS) code 214. The shift register 212 is configured to receive the input signal from the input 211 of the decoding module 210 and receive a clock signal from the micro controller unit 110, so as to perform a DSSS decoding process. In this embodiment, the shift register 212 is a 64 bit shift register, and the micro controller unit 100 provides a 2 MHz clock signal. However, the present invention is not limited thereto, other suitable shift registers and clock signals may also be used. Then, the shift register 212 will perform XOR operation and summation operation with the clock signal and the DSSS code 214, in order to correspondingly generate an operation result.

Further, the decoding module 210 may include a comparator 216, which is configured to receive the operation result. When the comparator 216 receives the operation result, the comparator 216 determines whether the operation result is bit 1 or bit 0, so as to generate the decoded input content accordingly. Then, the decoding module 210 will send the decoded input content (such as, the background information or the control commands of the touch panel) to the micro controller unit 100, so that the micro controller unit 100 may generate the feedback data according to the decoded input content, and the feedback data is then transmitted to the modulating module 220 for the modulation process. The modulated feedback data will be transmitted to the touch panel.

More specifically, the modulating module 220 can include a serial interface 222 and a multiplexer 224. The serial interface 222 is configured to buffer and receive the feedback data, and the multiplexer 224 is electrically connected with the serial interface 222. The micro controller unit 100 will transmit the feedback data from the serial interface 222 to the multiplexer 224 for the modulation process.

Further, the modulating module 220 may include an inverter 226 and a fractional-N frequency divider 228. The inverter 226 is electrically connected with the multiplexer 224. The fractional-N frequency divider 228 is electrically connected with the multiplexer 224 and the inverter 226. The fractional-N frequency divider 228 receives a clock signal from the micro controller unit 100 and performs a frequency division process with the clock signal so as to generate a frequency divided clock signal. The frequency divided clock signal is transmitted to the multiplexer 244 and the inverter 226. However, when the inverter 226 receives the frequency divided clock signal, the inverter 226 correspondingly generates an inverted frequency divided clock signal, and the inverted frequency divided clock signal is then transmitted to the multiplexer 224. In this embodiment, the micro controller unit 100 provides a 2 MHz clock signal, and the fractional-N frequency divider, the integer N of which is 8, is used for illustration. Therefore, the frequency of the frequency divided clock signal is 250 KHz, and the frequency of the inverted frequency divided clock signal is 1/250 KHz. Accordingly, the multiplexer 214 can perform the modulation process with the feedback data by using the frequency divided clock signal and the inverted frequency divided clock signal, so as to generate the DBPSK output signal.

Referring to FIG. 1 and FIG. 2, the signal decoding and modulation processing system 1000 may further includes a high voltage circuit 500, which is electrically connected with the multiplexer 224 of the digital processing unit 200. The DBPSK output signal is transmitted to the high voltage circuit 500. Moreover, when the high voltage circuit 500 receives the DBPSK output signal, the high voltage circuit 500 will correspondingly generate a high voltage transmitting signal, such that the high voltage transmitting signal can be transmitted to the touch panel by a refill of the capacitive stylus. Thus, the bi-directional signal transmission and the feedback effect between the capacitive touch panel and the capacitive stylus can be well realized.

Moreover, the signal decoding and modulation processing system 1000 can includes a battery 600 and a DC power converter 700. The DC power converter 700 is electrically connected with the battery 600 and configured to convert a power of the battery 600 for the micro controller unit 100 and the digital processing unit 200 to perform the above signal process.

Referring to FIG. 1, the signal decoding and modulation processing system 1000 may further include a pressure sensor 800, which is electrically connected with the micro controller unit 100 and configured to transmit a pressure sensing signal to the micro controller unit 100, so that the pressure sensing signal may be transmitted to the touch panel through the digital processing unit 200 and the high voltage circuit 500 and the touch panel may correspondingly display the thickness and shades of the writing or drawing according to the pressure sensing signal. In addition, the signal decoding and modulation processing system 1000 may also include a button 900. The button 900 is electrically connected with the micro controller unit 100 and configured for a user to input a control signal to the micro controller unit 100. Thus, the control signal can be transmitted to the touch panel by the digital processing unit 200 and the high voltage circuit 500, so as to control the display function of the touch panel.

Although specific embodiments have been illustrated and described, it will be appreciated by those skilled in the art that various modifications may be made without departing from the scope of the present invention, which is intended to be limited solely by the appended claims.

What is claimed is:

1. A signal decoding and modulation processing system for a capacitive stylus, comprising:
   a micro controller unit; and
   a digital processing unit, electrically connected with the micro controller unit, wherein the digital processing unit comprises:
   a decoding module, configured to decode an input signal from a touch panel so as to correspondingly generate a decoded input content, and the decoded input content is transmitted to the micro controller unit, wherein the micro controller unit generates a feedback data according to the decoded input content; and
   a modulating module, configured to receive the feedback data from the micro controller unit and perform a modulation process accordingly so as to generate a differential binary phase shift keying (DBPSK) output signal, which is sent back to the touch panel;
   wherein the decoding module comprises:
   a shift register, configured to receive the input signal from the input of the decoding module, and receive a clock signal from the micro controller unit; and
   a direct sequence spread spectrum (DSSS) code, wherein the shift register performs XOR operation and summation operation with the DSSS code, in order to correspondingly generate an operation result.

2. The signal decoding and modulation processing system of claim 1, wherein the capacitive stylus comprises a receiving ring, and the input signal is generated from the touch panel, and when the capacitive stylus is connected with the touch panel, the input signal is transmitted from the receiving ring to the capacitive stylus.

3. The signal decoding and modulation processing system of claim 1, further comprising an operational amplifier and a comparator, wherein after the input signal is processed by the operational amplifier and the comparator in sequential order, the input signal is transmitted to an input of the decoding module of the digital processing unit.

4. The signal decoding and modulation processing system of claim 1, wherein the decoding module further comprises:
 a comparator, configured to receive the operation result and determine the operation result is bit 1 or bit 0, in order to generate the decoded input content.

5. The signal decoding and modulation processing system of claim 1, further comprising a transmitting-signal generating circuit for generating a transmitting signal, electrically connected with a multiplexer of the digital processing unit, wherein the DBPSK output signal is transmitted to the transmitting-signal generating circuit.

6. The signal decoding and modulation processing system of claim 5, wherein the transmitting-signal generating circuit transmits the DBPSK output signal from the capacitive stylus to the touch panel.

7. The signal decoding and modulation processing system of claim 1, further comprising:
 a battery; and
 a DC power converter, electrically connected with the battery, and configured to convert a power of the battery for the micro controller unit and the digital processing unit.

8. The signal decoding and modulation processing system of claim 1, further comprising a pressure sensor, electrically connected the micro controller unit, and configured to transmit a pressure sensing signal to the micro controller unit.

9. The signal decoding and modulation processing system of claim 1, further comprising a button, electrically connected the micro controller unit, and configured for a user to input a control signal to the micro controller unit.

10. A signal decoding and modulation processing system for a capacitive stylus, comprising:
 a micro controller unit; and
 a digital processing unit, electrically connected with the micro controller unit, wherein the digital processing unit comprises:
  a decoding module, configured to decode an input signal from a touch panel so as to correspondingly generate a decoded input content, and the decoded input content is transmitted to the micro controller unit, wherein the micro controller unit generates a feedback data according to the decoded input content; and
  a modulating module, configured to receive the feedback data from the micro controller unit and perform a modulation process accordingly so as to generate a differential binary phase shift keying (DBPSK) output signal, which is sent back to the touch panel;
 wherein the modulating module comprises:
  a serial interface, configured to buffer and receive the feedback data; and
  a multiplexer, electrically connected with the serial interface, wherein the feedback data is transmitted from the serial interface to the multiplexer, for the modulation process;
 the modulating module further comprising:
  an inverter, electrically connected with the multiplexer; and
  a fractional-N frequency divider, electrically connected with the multiplexer and the inverter, wherein the fractional-N frequency divider receives a clock signal from the micro controller unit and performs a frequency division process with the clock signal so as to generate a frequency divided clock signal, and the frequency divided clock signal is transmitted to the multiplexer and the inverter;
 wherein when the inverter receives the frequency divided clock signal, the inverter correspondingly generates an inverted frequency divided clock signal, and the inverted frequency divided clock signal is transmitted to the multiplexer.

11. The signal decoding and modulation processing system of claim 10, wherein the multiplexer performs a modulation process with the feedback data by using the frequency divided clock signal and the inverted frequency divided clock signal, so as to generate the DBPSK output signal.

\* \* \* \* \*